(12) United States Patent
Nauman et al.

(10) Patent No.: US 8,086,539 B2
(45) Date of Patent: Dec. 27, 2011

(54) VALUE PROCESSING NETWORK AND METHODS

(75) Inventors: George Nauman, Omaha, NE (US); Judy Turek, Omaha, NE (US); Doug Swartz, Omaha, NE (US); Vicki Abel, Elkhorn, NE (US)

(73) Assignee: The Western Union Company, Englewood, CO (US)

( * ) Notice: Subject to any disclaimer, the term of this patent is extended or adjusted under 35 U.S.C. 154(b) by 1789 days.

(21) Appl. No.: 10/460,741

(22) Filed: Jun. 11, 2003

(65) Prior Publication Data

US 2004/0039693 A1    Feb. 26, 2004

Related U.S. Application Data (60) Provisional application No. 60/388,047, filed on Jun. 11, 2002.

(51) Int. Cl.
*G06O 20/00* (2006.01)

(52) U.S. Cl. .................. 705/64; 705/67; 705/75
(58) Field of Classification Search ............. 705/50–79
See application file for complete search history.

(56) References Cited

U.S. PATENT DOCUMENTS

| | | | |
|---|---|---|---|
| 3,599,151 A | 8/1971 | Harr | |
| 3,833,395 A | 9/1974 | Gosnell | |
| 4,321,672 A | 3/1982 | Braun et al. | |
| 4,491,725 A | 1/1985 | Pritchard | |
| 4,562,340 A | 12/1985 | Tateisi et al. | |
| 4,562,341 A | 12/1985 | Ohmae et al. | |
| 4,630,200 A | 12/1986 | Ohmae et al. | |
| 4,678,895 A | 7/1987 | Tateisi et al. | |
| 4,722,554 A | 2/1988 | Pettit | |

(Continued)

FOREIGN PATENT DOCUMENTS

EP    0481135 A1    4/1992

(Continued)

OTHER PUBLICATIONS

Website: "Tranz 330 Fast, Low-Cost Transaction Automation At the Point of Service" Verifone Finance, Jan. 1999, pp. 1-3, at [http://www.vfi-finance.com/tranz330.htm].

(Continued)

*Primary Examiner* — Andrew J. Fischer
*Assistant Examiner* — Murali Dega
(74) *Attorney, Agent, or Firm* — Kilpatrick Townsend & Stockton LLP (57) ABSTRACT

A method of processing a transaction involving at least two parties includes establishing rules that define transaction processing between combinations of a plurality of origination entities and a plurality of destination entities and storing the rules at a storage arrangement associated with a host computer system. The method also includes receiving at the host computer system transaction information relating to the transaction between the two parties. One of the parties is a particular one of the origination entities and one of the parties is a particular one of the destination entities. The transaction information contains at least an identifier from which at least one of the parties may be identified. The method also includes using the transaction information at the host computer system to identify at least one of the parties and consulting the storage arrangement to determine the rules that define transaction processing for the at least one party. The method also includes processing the transaction based, at least in part, on the rules.

27 Claims, 4 Drawing Sheets

U.S. PATENT DOCUMENTS

| | | | |
|---|---|---|---|
| 4,812,628 A | | 3/1989 | Boston et al. |
| 4,961,142 A | | 10/1990 | Elliott et al. |
| 5,070,452 A | | 12/1991 | Doyle et al. |
| 5,119,293 A | | 6/1992 | Hammond |
| 5,175,682 A | | 12/1992 | Higashiyama et al. |
| 5,220,501 A | * | 6/1993 | Lawlor et al. ............... 705/40 |
| 5,283,829 A | | 2/1994 | Anderson |
| 5,367,452 A | | 11/1994 | Gallery et al. |
| 5,408,077 A | | 4/1995 | Campo et al. |
| 5,426,594 A | | 6/1995 | Wright et al. |
| 5,464,971 A | | 11/1995 | Sutcliffe et al. |
| 5,484,988 A | | 1/1996 | Hills et al. |
| 5,491,325 A | | 2/1996 | Huang et al. |
| 5,504,677 A | | 4/1996 | Pollin |
| 5,510,979 A | | 4/1996 | Moderi et al. |
| 5,555,496 A | | 9/1996 | Tackbary et al. |
| 5,577,109 A | | 11/1996 | Stimson et al. |
| 5,622,388 A | | 4/1997 | Alcordo |
| 5,657,201 A | | 8/1997 | Kochis |
| 5,677,955 A | * | 10/1997 | Doggett et al. ............. 705/76 |
| 5,679,940 A | | 10/1997 | Templeton et al. |
| 5,699,528 A | | 12/1997 | Hogan |
| 5,757,917 A | | 5/1998 | Rose et al. |
| 5,794,207 A | | 8/1998 | Walker et al. |
| 5,815,657 A | | 9/1998 | Williams et al. |
| 5,826,241 A | | 10/1998 | Stein et al. |
| 5,828,875 A | | 10/1998 | Halvarsson et al. |
| 5,832,463 A | | 11/1998 | Funk |
| 5,893,080 A | | 4/1999 | McGurl et al. |
| 5,910,988 A | | 6/1999 | Ballard |
| 5,940,811 A | | 8/1999 | Norris |
| 5,949,044 A | | 9/1999 | Walker et al. |
| 5,956,700 A | | 9/1999 | Landry |
| 5,960,412 A | | 9/1999 | Tackbary et al. |
| 5,987,426 A | | 11/1999 | Goodwin, III |
| 5,987,429 A | | 11/1999 | Maritzen et al. |
| 6,012,035 A | | 1/2000 | Freeman et al. |
| 6,014,636 A | * | 1/2000 | Reeder ............. 705/17 |
| 6,029,150 A | | 2/2000 | Kravitz |
| 6,030,000 A | | 2/2000 | Diamond |
| 6,032,133 A | | 2/2000 | Hilt et al. |
| 6,032,137 A | | 2/2000 | Ballard |
| 6,032,859 A | | 3/2000 | Muehlberger et al. |
| 6,039,245 A | * | 3/2000 | Symonds et al. ........ 235/379 |
| 6,058,417 A | | 5/2000 | Hess et al. |
| 6,064,990 A | | 5/2000 | Goldsmith |
| 6,070,798 A | | 6/2000 | Nethery |
| 6,097,834 A | | 8/2000 | Krouse et al. |
| 6,106,020 A | | 8/2000 | Leef et al. |
| 6,108,641 A | | 8/2000 | Kenna et al. |
| 6,119,106 A | | 9/2000 | Mersky et al. |
| 6,122,625 A | | 9/2000 | Rosen |
| 6,164,528 A | | 12/2000 | Hills et al. |
| 6,175,823 B1 | | 1/2001 | Van Dusen |
| 6,193,152 B1 | | 2/2001 | Fernando et al. |
| 6,199,761 B1 | | 3/2001 | Drexler |
| 6,209,095 B1 | * | 3/2001 | Anderson et al. ........... 713/176 |
| 6,230,201 B1 | | 5/2001 | Guck et al. |
| 6,246,996 B1 | | 6/2001 | Stein et al. |
| 6,305,604 B1 | | 10/2001 | Ono |
| 6,308,887 B1 | | 10/2001 | Korman et al. |
| 6,308,890 B1 | | 10/2001 | Cooper |
| 6,327,575 B1 | | 12/2001 | Katz |
| 6,360,254 B1 | | 3/2002 | Linden et al. |
| 6,367,693 B1 | | 4/2002 | Novogrod |
| 6,405,176 B1 | | 6/2002 | Toohey |
| 6,453,297 B1 | | 9/2002 | Burks et al. |
| 6,453,306 B1 | | 9/2002 | Quelene |
| 6,473,470 B1 | | 10/2002 | Cockrill et al. |
| 6,473,740 B2 | | 10/2002 | Cockrill et al. |
| 6,484,936 B1 | | 11/2002 | Nicoll et al. |
| 6,539,363 B1 | | 3/2003 | Allgeier et al. |
| 6,547,132 B1 | | 4/2003 | Templeton et al. |
| 6,827,260 B2 | | 12/2004 | Stoutenburg et al. |
| 6,834,271 B1 | * | 12/2004 | Hodgson et al. ............ 705/72 |
| 6,886,742 B2 | | 5/2005 | Stoutenburg et al. |
| 6,999,943 B1 | * | 2/2006 | Johnson et al. ............. 705/39 |
| 7,174,302 B2 | | 2/2007 | Patricelli et al. |
| 2001/0037361 A1 | | 11/2001 | Croy |
| 2001/0051876 A1 | | 12/2001 | Seigel et al. |
| 2001/0056379 A1 | | 12/2001 | Fujinaga et al. |
| 2002/0116324 A1 | | 8/2002 | Macias |
| 2002/0123972 A1 | * | 9/2002 | Hodgson et al. ............ 705/72 |
| 2002/0138363 A1 | | 9/2002 | Karas et al. |
| 2002/0152179 A1 | * | 10/2002 | Racov ............. 705/67 |
| 2002/0153414 A1 | | 10/2002 | Stoutenburg |
| 2002/0174020 A1 | | 11/2002 | Grey et al. |
| 2003/0097343 A1 | * | 5/2003 | Pinizzotto ............. 705/75 |
| 2003/0111529 A1 | | 6/2003 | Templeton et al. |
| 2003/0126094 A1 | * | 7/2003 | Fisher et al. ............. 705/75 |
| 2003/0189782 A1 | | 10/2003 | Leonhardt et al. |
| 2003/0195859 A1 | * | 10/2003 | Lawrence ............. 705/75 |
| 2003/0222135 A1 | | 12/2003 | Stoutenburg et al. |
| 2004/0015435 A1 | * | 1/2004 | Solomon et al. ............. 705/39 |
| 2004/0039693 A1 | | 2/2004 | Nauman et al. |
| 2004/0148203 A1 | | 7/2004 | Whitaker et al. |
| 2005/0015280 A1 | | 1/2005 | Gabel et al. |
| 2005/0125258 A1 | | 6/2005 | Yellin et al. |

FOREIGN PATENT DOCUMENTS

| | | |
|---|---|---|
| EP | 0949596 A2 | 10/1999 |
| EP | 1077436 A2 | 2/2001 |
| WO | WO 00/46725 A1 | 8/2000 |
| WO | WO 00/67177 A2 | 11/2000 |
| WO | WO 01/04816 A1 | 1/2001 |
| WO | WO 02/05195 A1 | 1/2002 |

OTHER PUBLICATIONS

Business Wire, "E-Commerce, Email and E-greeting Cards Combine in New Web Site Designed by Interactive Bureau", Sep. 14, 1999 (abstract), [online] [retrieved on May 1, 2002], retrieved from PROQUEST Database, 2 pages.

PR Newswire, "GiftSpot.com Simplifies Gift-Giving on the Internet," Oct. 20, 1999 (abstract), [online] [retrieved on May 1, 2002], retrieved from PROQUEST Database, 5 pages.

x.com, "Do More with Your Money", downloaded from website http://www.x.com., Feb. 7, 2000, 5 pages.

DOTBANK, "The Way to Send and Receive Money on the Internet", downloaded from website http://www.dotbank.com, Feb. 7, 2000, 6 pages.

IDEALAB Company, PayMe.com, downloaded from website http://ssl.idealab.com on Feb. 16, 2000, 7 pages.

CONFINITY, Inc., PayPal.com, "How PayPal.com Works", downloaded from website http://www.paypal.com on Feb. 7, 2000, 7 pages.

"Gemplus: Secure Management of Medical and Administrative Data," obtained from website http://web.archive.org/web/20010609222540/www.gemplus.com/app/health/index.htm on Aug. 1, 2007, 20 pages.

"MCI to Provide Backbone for Smart Card Health Care Claims Processing," Communications Today, Potomac: Dec. 11, 1997, 2 pages.

Maxey, Brigitte, "New Card to Aid the Sick Onecard will store health, credit data," The Sun, Baltimore, MD: Dec. 16, 1991, 2 pages.

* cited by examiner

VALUE PROCESSING NETWORK AND METHODS

CROSS-REFERENCES TO RELATED APPLICATIONS

This application is a non-provisional of and claims the benefit of co-pending, commonly assigned U.S. Provisional Patent Application No. 60/388,047 entitled "CLOSED LOOP FINANCIAL PROCESSING SYSTEMS AND METHODS", filed on Jun. 11, 2002, by Nauman, et al., the entire disclosure of which is herein incorporated by reference for all purposes.

BACKGROUND OF THE INVENTION

This invention relates generally to the field of computing systems and methods for using them. More specifically, the invention relates to computing systems programmed to process value transactions through one or more processing networks in a selectable manner.

A merchant who accepts electronic forms of payment in exchange for goods or services generally has an agreement with a bank, or other entity, for processing transactions. As part of the agreement, the merchant maintains an account at the bank for deposit and withdrawal of funds associated with the merchant's electronic payment transactions.

Account identifiers, in the form of a card or other token such as a paper check or RF fob, are issued to accountholders by a variety of account issuers, including banks, retailers, or other financial service providers. In the case of "interchange" accounts, e.g., VISA® or MASTERCARD® card products, ACH, or bank issued debit cards, there is a third party brand owner (card association or debit network or Federal Reserve) that acts as an intermediary between the merchant's bank and the account issuer to complete the transaction. (Rather than issuing accounts and account identifier tokens itself, a brand owner generally licenses other entities to issue accounts under its brand name.) This intermediary not only licenses its brand and sets rules for use of the account, but operates a computer processing system, generally called a branded network, which routes and settles its own brand of transactions. In the case of "private label" credit cards, e.g., credit cards issued by a retailer, there is generally no intermediary; hence, such cards are generally accepted only by the issuing entity (or in some cases its subsidiaries).

A typical electronic payment sales transaction begins when an accountholder presents an account identifier token to purchase goods or services from a merchant. The merchant transmits an authorization request to its bank. In the case of interchange accounts, the merchant's bank typically does not have direct access to information regarding account status, so the merchant's bank forwards the request to the appropriate network for authorization.

If the transaction is authorized, an authorization code is returned to the merchant. The merchant completes the sales transaction by delivering the goods or services and obtaining in exchange a ticket representing the cardholder's agreement to pay the card issuer. The ticket is typically a piece of paper (usually signed by the cardholder) or an electronic equivalent. The ticket provides sufficient information to identify the accountholder, the account identifier token used, the merchant, and the amount of the sales transaction.

Next, the merchant collects payment for the sales transaction by presenting the ticket to his bank. Typically, the merchant accumulates tickets from a number of sales transactions (e.g., all transactions from one day) and presents a batch of tickets together to the bank. The merchant's bank buys the ticket and deposits funds into the merchant's account. In general, the amount of funds deposited into the merchant's account is less than the amount of the sales transaction by a percentage (the "discount rate") established between the merchant and his bank. The merchant's bank may also maintain a reserve against the merchant account by temporarily withholding part of the funds in order to cover the risk that the bank is not subsequently repaid by an account issuer for any of the merchant's transactions. Funds held in reserve are usually released to the merchant account after some period of time.

The merchant's bank presents the ticket to the account issuer for settlement. Settlement requests may be processed in batches and are usually routed through a branded network rather than being sent directly to the account issuer. The account issuer transfers funds to the merchant's bank in exchange for the ticket. The amount of funds transferred is, in general, less than the amount of the sales transaction because the account issuer deducts an "interchange fee" reflecting the delay between the account issuer's payment of funds to the merchant and the accountholder's payment to the issuer, as well as merchant fraud losses and costs associated with use of a brand's interchange services. At some point after settlement, the account issuer bills the accountholder for the full amount of the transaction, or deducts the amount from the accountholder's account.

In a transaction where a retail or non-branded account is used, the processing is similar, except that the merchant's bank and the account issuer are generally the same entity. Thus, the account issuer directly authorizes the transaction, and a settlement between the issuer and the merchant's bank is not required. As is generally known, acquisition and settlement processing may have many other variations, depending on the product used and the terms of settlement agreements adopted by various account issuers and associations (e.g., some associations settle directly with the merchant and do not transfer funds via an intermediary).

Merchant banks are thus confronted with considerable complexity in managing payment processing operations, particularly when the bank provides processing services for a large number of merchants who accept a variety of payment types of different brands and/or issuers. Transactions must be received and routed, and accounting of debits and credits of funds during acquisition and settlement must be maintained. Information for each merchant must be kept up-to-date. Periodic account statements and other activity reports must be generated and sent to each merchant. Further, a merchant's bank may outsource some or all of its payment processing operations to a third-party provider of processing services. These third-party providers confront an added level of complexity because of the need to manage data and transactions for multiple banks.

Electronic payment processing rules, and the business relationships which the rules represent, are defined by the payment type and network over which the payment processing flows, rather than by the parties involved in the transaction. Thus, it is not possible for merchants and account issuers to easily define and implement new sets of rules representing individual business relationships.

Many types of electronic value exchange transactions involve processing methods having similar levels of complexity. For example, money transfers, discount certificate exchanges, loyalty point transactions, "pre-paid" commodity purchases, person-to-person barter, and the like, all involve some number of transaction steps. As a result, systems are needed, along with methods for using such systems, that improve the processing of such transactions, can be expanded to process an ever-increasing number of transaction types, and enable the establishment of a variety of business relationships governing said transactions.

BRIEF SUMMARY OF THE INVENTION

Embodiments of the invention thus provide a method of processing a transaction involving at least two parties. The method includes establishing rules that define transaction processing between combinations of a plurality of origination entities and a plurality of destination entities and storing the rules at a storage arrangement associated with a host computer system. The method also includes receiving at the host computer system transaction information relating to the transaction between the two parties. One of the parties is a particular one of the origination entities and one of the parties is a particular one of the destination entities. The transaction information contains at least an identifier from which at least one of the parties may be identified. The method also includes using the transaction information at the host computer system to identify at least one of the parties and consulting the storage arrangement to determine the rules that define transaction processing for the at least one party. The method also includes processing the transaction based, at least in part, on the rules.

In some embodiments, the rules define routing of the transaction, fees associated with the transaction, timing of settlement, method of settlement, aggregation and reporting, dispute resolution, compliance, fraud detection, and/or risk sharing. In some examples, the transaction may relate to a credit card transaction, retail card transaction, debit card transaction, account withdrawal, money transfer, gift card, negotiable instrument, loyalty or reward points, pre-paid commodities, insurance benefits, cell-phone minutes, stored value card, discount certificate or the like. Receiving transaction information may include receiving an electronic message or transmission from a transaction processing device. The transaction processing device may be an automated teller machine, a merchandise scanner, a point-of-sale device, a data entry device, a Radio Frequency (RF) fob, a point-of-sale computer, a money transfer device, a telephone, a PDA and/or the like. Processing the transaction may include forwarding information representing at least a portion of the transaction to a network or a destination processing system. The network may include the Automated Clearing House network, the Federal Reserve network, a branded network, a banking network, an international banking network, a money transfer network, a loyalty network, a health care benefits network, a discount certificate clearinghouse, the Internet, and/or the like.

In other embodiments of the invention, a system for processing a transaction involving at least two parties includes a host computer system and a storage arrangement. The storage arrangement may be configured to store rules that define transaction processing between combinations of a plurality of origination entities and a plurality of settlement entities. The host computer is programmed to receive transaction information relating to the transaction between the two parties. One of the parties is a particular one of the origination entities and one of the parties is a particular one of the destination entities. The transaction information contains at least an identifier from which at least one of the parties may be identified. The host computer system is further programmed to use the transaction information to identify at least one of the parties and consult the storage arrangement to determine the rules that define transaction processing for the at least one party. The host computer system is also programmed to cause the transaction to be processed based, at least in part, on the rules.

In some embodiments of a system according to the invention the host computer system is further programmed to receive an electronic message or transmission from a transaction initiation device. The transaction initiation device may be an automated teller machine, a merchandise scanner, a point-of-sale device, a point-of-sale computer, a data entry device, a Radio Frequency (RF) fob, a money transfer device, a telephone, a PDA, and/or the like. The host computer system also may be programmed to forward information representing at least a portion of the transaction to a destination computer processing system. The destination computer processing system may be the Automated Clearing House network, the Federal Reserve network, a branded network, a banking network, a money transfer network, an international banking network, a loyalty network, a health care benefits network, a discount certificate clearinghouse, the Internet, and/or the like.

In other embodiments of the invention, a network for processing transactions, includes means for receiving transaction information from a transaction initiation device. The transaction information relates to a transaction involving at least two parties, an origination entity and a destination entity. The parties have a pre-established relationship embodied in transaction processing rules. The transaction information comprises at least an identifier for determining at least one party to the transaction. The network also includes means for determining the rules relating to the transaction and means for processing, at least in part, the transaction.

In still other embodiments, a method of processing a transaction involving two parties, an origination entity and a destination entity, having a pre-established relationship embodied in rules relating to the relationship includes receiving transaction information relating to the transaction and identifying the origination entity and the destination entity at least in part from the transaction information. The method also includes consulting the rules to determine how the transaction should be processed and processing the transaction based at least in part on the rules.

In such embodiments, the destination entity may be an issuing financial institution, money transfer service provider, telephone company, airline, loyalty or rewards provider, manufacturer, insurance company, retailer bank, and/or the like. The transaction may involve value, which may be represented by a bank card account number, credit card account number, discount certificate, bank account number, debit card account number, stored value account number, insurance coverage identifier, money transfer identifier, loyalty account identifier, telephone account number, airline ticket PNR identifier, gift card identifier, and/or the like. The value may be money, credits, loyalty points, minutes, miles, and insurance benefits. The method may include receiving additional rules from a second destination entity and processing a second transaction according to the additional rules. The method also may include identifying processing rules relating to the destination entity. Identifying processing rules may include consulting a table having rules information relating to a plurality of destination entities. Processing the transaction may include aggregating a plurality of transactions having a common destination entity and sending a request for reimbursement to the destination entity. Processing the transaction also may include aggregating a plurality of transactions having a common origination entity and sending a reimbursement to the origination entity.

In still other embodiments, a system for processing a value transaction between an origination entity and a destination entity includes an input transaction handler that determines a transaction type and accesses an appropriate format and data and transaction validation according to a ruleset obtained from a rules service based on the origination entity. The system also includes a routing service that identifies the destination entity using rules for the particular transaction type and a fee calculation service that determines a fee to apply and any calculations to perform based on rules identified by a relationship between the origination entity and the destination entity. The fee service also performs the calculations and attaches fee information to the transaction. The system also includes an output transaction handler that formats, validates, and sends the transaction based on rules determined by the identity of the destination entity. The system may include a transaction aggregation service that uses rules to determine how the origination entity and the destination entity require transaction information to be combined for their businesses. This may include both transaction grouping and transaction summarization. The system also may include a reconciliation service that uses information from the transaction aggregation service to balance multiple transactions according to rules for the transaction types. The system also may include a funds movement service that generates instructions based upon the rules defined by origination and destination entities for an actual value-exchange represented by a particular group of transactions.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The invention provides for the processing of value transactions through one or more processing networks in a selectable manner with processing rules determined by the parties involved in the transaction. Herein "value" will be understood to mean any commodity that may be expressed in units. For example, value may comprise money, credits, loyalty points (e.g., miles, as more fully described in co-pending, commonly assigned U.S. patent application Ser. No. 10/386,027, entitled, "SYSTEMS AND METHODS FOR REDEEMING REWARDS ASSOCIATED WITH ACCOUNTS" filed on Mar. 10, 2003, by Blagg, et al., which application is entirely incorporated herein by reference), minutes (e.g., pre-paid cell phone minutes), discount certificates (e.g., manufacturer's coupons as more fully described in co-pending, commonly assigned U.S. patent application Ser. No. 10/268,040, entitled, "DISCOUNT-INSTRUMENT METHODS AND SYSTEMS" filed on Oct. 8, 2002, by McGee, et al., which application is entirely incorporated herein by reference), and/or or the like. Although specific examples reference payments for goods or services, value may flow in either direction between the transaction parties. Thus, value may appear to be negative to an individual party, as might be the case, for example, with respect to credit card refunds, or chargebacks. Many other examples are possible.

According to embodiments of the invention, a transaction is initiated in any of a wide variety of ways. In one example, the transaction is a credit card transaction wherein a customer purchases an item from a merchant. While this example is discussed in terms of credit card transactions, it will be appreciated that the invention may be used with other transactions as well. For example, the invention may be used with direct deposit transactions, money transfer transactions, ACH transactions, and the like. A credit card acquirer or issuer may have various options on how to route and process financial transactions. For example, certain accounts may be flagged so that they pass through a card association branded network while others do not. Further, for transactions that do not utilize the card association network, such transactions may be transmitted to specific processing platforms. This process happens in an automated fashion so that authorization and settlement may proceed in an efficient manner.

Initially, a transaction originates at a transaction initiator. This may be from a point of sale device, through the Internet, from a money transfer system, or the like. The transaction utilizes some type of account identifier, such as a credit card number, that identifies the account that is to be charged for the transaction. The account identifier, along with other information on the transaction (such as the purchase amount) is transmitted to a processing system. In the case of credit card transactions, the processing system may be a processing platform that accepts transactions from certain merchants. For example, a shoe store may agree to have its credit card transactions processed by the processing system. Once the transaction is received, the account identifier, the originating merchant identifier, and the transaction type are evaluated to determine how the transaction should be routed, cleared, and settled.

The processing system may include a routing table that includes information on how a transaction should be routed based on the analysis of the aforementioned identifiers. For example, an issuing bank may decide that certain of its cards are to be processed through a card association system, such as MASTER CARD®, while others of its cards are to proceed directly to an issuing organization processing system. This information may be provided to the processing system and included in the routing tables so that each time a transaction that is associated with a card of the issuer is received at the processing system, it may be automatically routed to the correct processing system.

If the processing rules indicate the transaction should proceed to a branded network, the transaction is in turn routed to one of the issuing organization processing systems as described above for authorization, clearing, and settlement. Otherwise, the transaction is routed directly to one of the issuing organization processing systems for authorization and settlement. This scenario permits authorization and settlement to proceed as rapidly as possible, and also may reduce transaction costs.

In some cases, the issuer and merchant may be the same entity or may use the same processing system. In such cases, all processing may occur using the same system. For example, if both the merchant and the issuer used the same processing system, processing may all occur using that processing system. However, in many cases, the issuer and the acquirer may be set up to process using different systems or platforms. By using the routing table, an issuer may be able to receive transactions at the issuer's processing system directly from the merchant's processing system and vice versa.

Another significant advantage of some embodiments is that the issuer has the flexibility to indicate different portions of its account portfolio may be directed to process using different routing mechanisms and networks. Additionally, the account issuer, in agreement with merchant business partners may also apply other transaction processing rules regarding discount or processing fees, settlement timeframes, and the like. For example, an issuer may identify a group of accounts, such as premier cardholders, that are to be processed by going directly from one processing system to another processing system while all others may proceed through the branded network. Further, the issuer and a particular merchant may agree that no chargebacks other than for reasons of merchant fraud will be allowed, and that for this consideration, the merchant will apply more stringent fraud detection methods. In return the issuer additionally agrees to reduce the interchange fee.

As another specific example, an issuer may decide to implement a marketing campaign to increase the usage of its cards. To do so, the issuer may contract with a merchant, where the merchant agrees that all purchases using the issuer's card will be processed by going directly from one particular processing system to another processing system. A consumer may then be provided with marketing material suggesting the use of the issuer's card at the merchant's store, perhaps to receive a discount on a certain purchase. When the consumer makes the purchase, the transaction proceeds to the first processing system which routes the transaction directly to the second processing system for authorization based on the routing table. If authorized, a reply is transmitted back to the merchant so that the sale may proceed. The transaction is then transmitted directly to the second processing system for settlement. In so doing, transaction processing fees may be reduced. As such, the agreement between the issuer and the merchant may provide the merchant with reduced fees, thereby enabling the merchant to offer better incentives to its customers.

The foregoing specific examples are provided for illustration purposes only and are not to be considered limiting since many other examples of the present invention are possible, as will be understood by those having skill in the art in light of this description.

Figure 1:
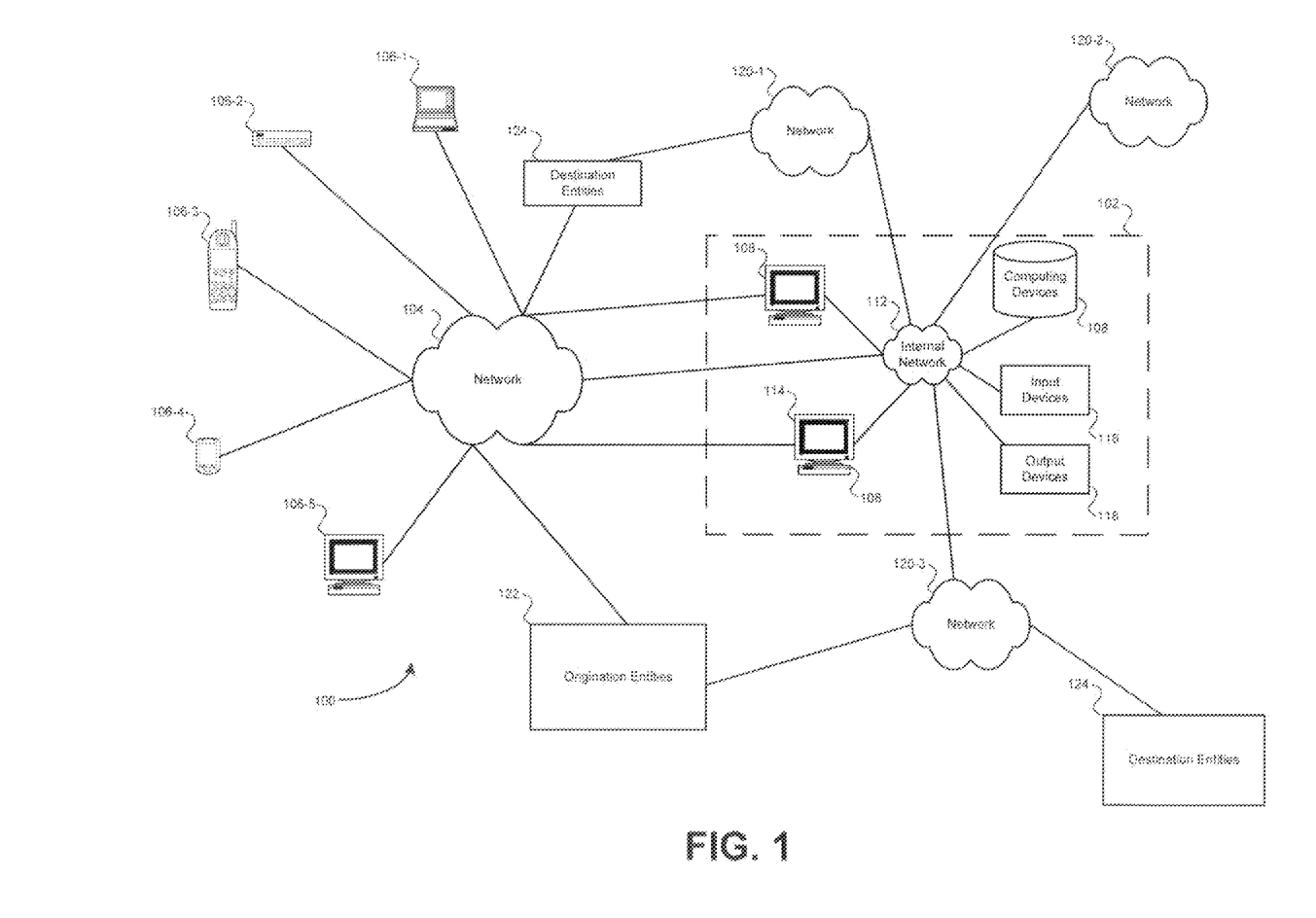
FIG. 1 illustrates a system according to embodiments of the invention.

Having described one example of an embodiment of the invention generally, attention is directed to FIG. 1, which illustrates an example of a system 100 according to embodiments of the present invention. It is to be understood that the system 100 is exemplary and that those skilled in the art will realize other embodiments in light of the disclosure herein. The system 100 comprises a host computer system 102 and a network 104 through which the host computer system may communicate with one or more transaction initiation devices 106. The host computer system 102 may comprise one or more computing devices 108, storage arrangements 110, internal networks 112, display devices 114, input devices 116, output devices 118, and the like. In some embodiments, the host computer system 102 is distributed throughout a large geographic area, including both terrestrial and extraterrestrial locations, as would be the case for embodiments that include, for example, satellite links. In other embodiments, the host computer system 102 exists within a single facility. In still other embodiments, the host computer system 102 comprises a single computing device.

Each computing device 108 may be a work station, a PC, a laptop, a mainframe, a PDA, or the like, or any other type of computing device. Each storage arrangement 110 may be a server, a database, or the like, or any other type of storage arrangement, and may include magnetic, optical, solid state memory, and/or the like, or any other type of storage medium. The internal networks 112 may be wired or wireless, and may include the Internet, a virtual private network, a local area network, a wide area network, and/or the like. The display devices 114 may be any type of device that allows for the display of information. Each input device 116 may be a keyboard, a mouse, a voice recognition device, a key pad, and/or the like, or any other type of input device. Each output devices 118 may be a printer, a projector, and/or the like, or any other type of output device. Other components of the host computer system 102 may include servers, routers, switches, and/or the like.

The network 104 may comprise the Internet, or any other wired or wireless network, including those listed above with respect to the internal network 112.

Each transaction initiation device 106 may comprise a point-of-sale (POS) device (as more fully described in co-pending, commonly assigned U.S. patent application Ser. No. 09/634,901, entitled, "POINT-OF-SALE PAYMENT TERMINAL", filed on Aug. 9, 2000 by Templeton, et al., which application is entirely incorporated herein by reference), an automated teller machine (ATM), a multi-purpose kiosk (as more fully described in co-pending, commonly assigned U.S. patent application Ser. No. 10/225,410, entitled, "MULTI-PURPOSE KIOSK AND METHODS", Aug. 20, 2002, by Blair, et al., which application is entirely incorporated herein by reference), a computing device, a money transfer POS device, a cash register, a checkout scanner, a customer service representation (CSR) computer, a cell phone, a PDA, and/or the like, or any other type of transaction initiation device. The transaction initiation devices may be located at merchant locations, call centers, money transfer locations, public gathering places such as shopping malls, post offices, parks, transportation centers, sporting arenas, and the like. Transaction initiation devices 106 also may comprise devices carried by or worn by consumers or other transaction initiators. Many other examples are possible. For example, a POS device at a health insurance service provider may comprise a credit card transaction terminal and a health insurance eligibility terminal.

The host computer system 102 may be configured to communicate with other networks 120, which may comprise, for example, banking networks (such as the Automated Clearing House network, the Federal Reserve network, BACS®, Swift®, or the like), debit networks (such as the STAR® network, the NYCE® network, or the like), a branded card network (such as the VISA®, MasterCard®, Discover®, American Express®, or EuroPay® networks, or the like), a money transfer network (such as the WESTERN UNION® network or the like), health benefits exchange networks (such as ProxyMed®, WebMD®, or the like), airline ticket exchanges (such as AIRINC® or the like), and/or the like.

Through the various networks, the host computer system 102 communicates with origination entities 122 and destination entities 124. Origination entities 122 may comprise merchants, acquiring banks, individuals, gift card or stored value card processors, health care providers, airlines, and the like. Destination entities 124 may comprise manufacturers, issuing banks, individuals, health care payers, employers, airlines, telephone companies, and the like. In some transactions, parties which are usually destination entities 124 may be origination entities 122, and origination entities 122 may be destination entities 124.

Figure 2A:
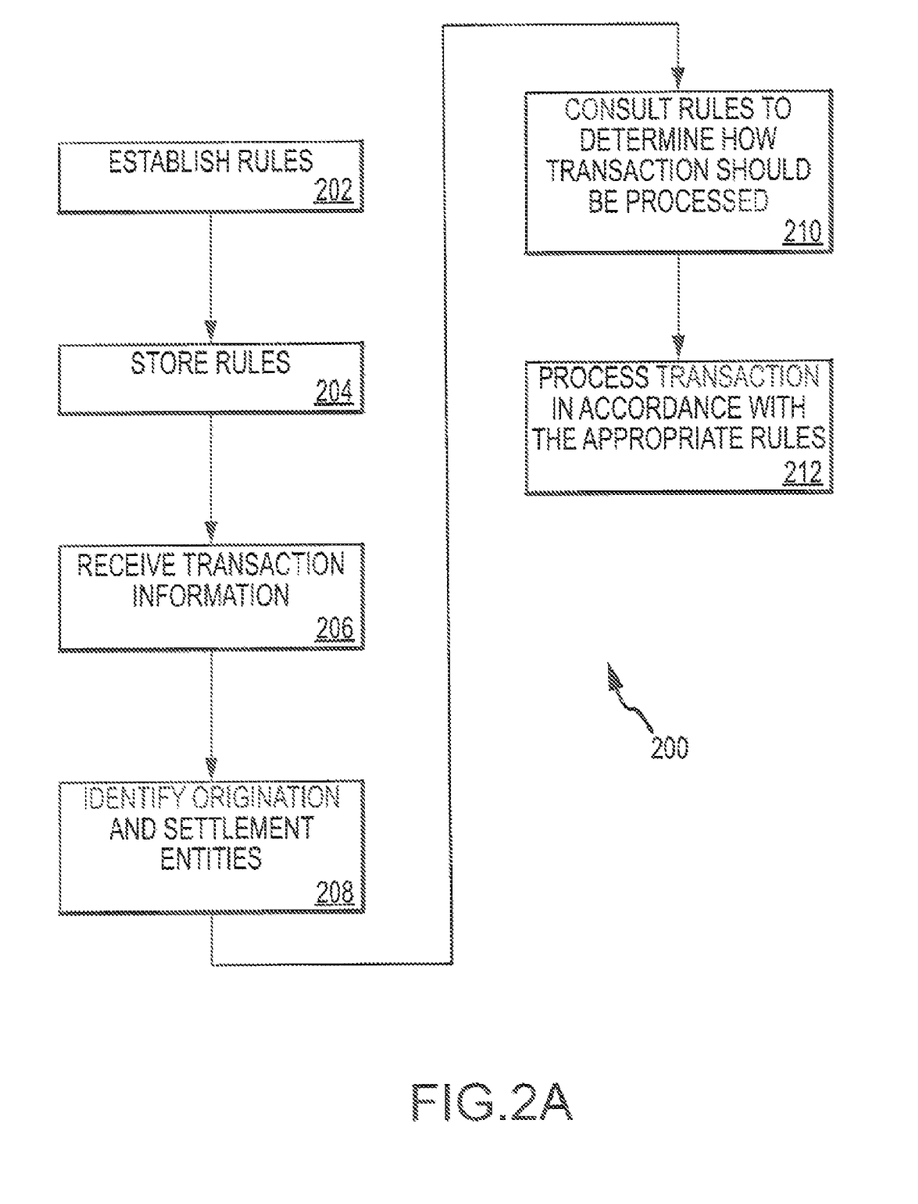
FIG. 2A illustrates a method according to embodiments of the invention, which method may be implemented in the system of FIG. 1.

Attention is directed to FIG. 2A, which illustrates one embodiment of a method 200 according to the present invention. The method may be implemented in the system 100 of FIG. 1 or other suitable system. It is to be understood that the method 200 is exemplary, and those skilled in the art will realize alternative embodiments in light of the disclosure herein. Further, the steps described herein need not be traversed in the order described. Further still, alternative methods may include more or fewer steps than that described herein, as will be recognized by those having skill in the art.

The method begins at block 202 wherein transaction processing rules are established. The rules may relate to any aspect of processing transactions. For example, the rules may relate to how transactions are routed, what fees are charged and by whom, the schedule for processing transactions, how the risk relating to transactions is assigned, how exceptions relating to transactions are processed, how fraud will be monitored, and/or the like. The rules may be established such that particular rules apply to: all transactions processed between two particular parties, (i.e., an origination entity and a destination entity), only certain transactions between parties, all transactions involving a particular destination entity, select transactions involving a particular destination entity, all transactions involving a particular origination entity, select transactions involving a particular destination entity, and/or the like. Other examples are possible.

Additionally, the rules may be imposed by either origination entities or settlement entities or may arise from mutual agreements between particular settlement and origination entities. In some examples, the rules are established by the owner of the brand for a branded transaction or the operator of a network that embodies an example of the present invention.

The rules may take many forms. For example, the rules may be as simple as routing tables configured in a computer-readable medium such as software or firmware. The rules may comprise software code that specifically implements each aspect of each rule. The rules may comprise complex logical statements such as might be used with a well known database management system. The rules may themselves be embodied in data entered into a database management system. The rules may be implemented by specifically designed electrical circuitry that "hard-codes" the rules. The rules may comprise any combination of the foregoing and/or the like, as is apparent to those of skill in the art in light of this disclosure.

Once the rules are established at block 202, the rules are stored in some manner that will allow them to be recalled and used for processing transactions. This occurs at block 204. The medium in which the rules are stored may depend on the form the rules take. In a specific example, the rules comprise data that may be stored in a database using a well known database management program or a specially-designed database management program.

At block 206, transaction information is received from a transaction initiation device. The transaction initiation device may comprise any of the aforementioned transaction initiation devices, or any device capable of capturing transaction information and forwarding it to the host computer system.

Having received the transaction information at block 206, the host computer system then uses the transaction information to identify the parties involved in the transaction (e.g., the origination entity and the destination entity) at block 208.

At block 210, the host computer system uses the identity of the origination entity and the destination entity to consult the rules to determine how transactions between these two entities are to be processed. The transaction is then processed accordingly at block 212.

The events that take place in blocks 206, 208, 210, and 212 may take many forms depending on the specific parties involved in the transaction and the type of transaction information received. The transaction processing information may comprise a wide variety of items. In a specific example, the transaction information minimally comprises an identifier from which the origination entity, the destination entity, and the value of the transaction may be determined. In one example relating to a branded credit card transaction, the transaction information comprises a credit card account number, a merchant identification number, and a charge amount. In this example, the credit card account number identifies the destination entity, which may be an issuing bank, the brand of the transaction, and the payment type (e.g., debit, credit, etc.). The merchant identifier either directly or indirectly identifies the origination entity, which may be a merchant, the merchant's bank (e.g., an acquiring bank), or the like. The charge amount identifies the amount that a customer charged in exchange for goods or services from the merchant. In some embodiments, the transaction may be a exception resolution (e.g., a chargeback) between the same parties, in which case the merchant is crediting the customer. In such a case the destination and origination roles are reversed, although the same transaction information may be used to identify the parties.

Further to the aforementioned example, the host computer system evaluates the credit card account number to identify the entity that issued the credit card. In this example the entity is a member of a branded card association. In such cases, the card association network may have rules which determine what transactions may be settled outside the branded network. In this case, the processing rules established by the brand can override the processing rules determined by the originator and destination agreement. Many other examples are possible. In some embodiments, multiple transactions are consolidated, which greatly improves the efficiency with which transaction are settled.

Figure 2B:
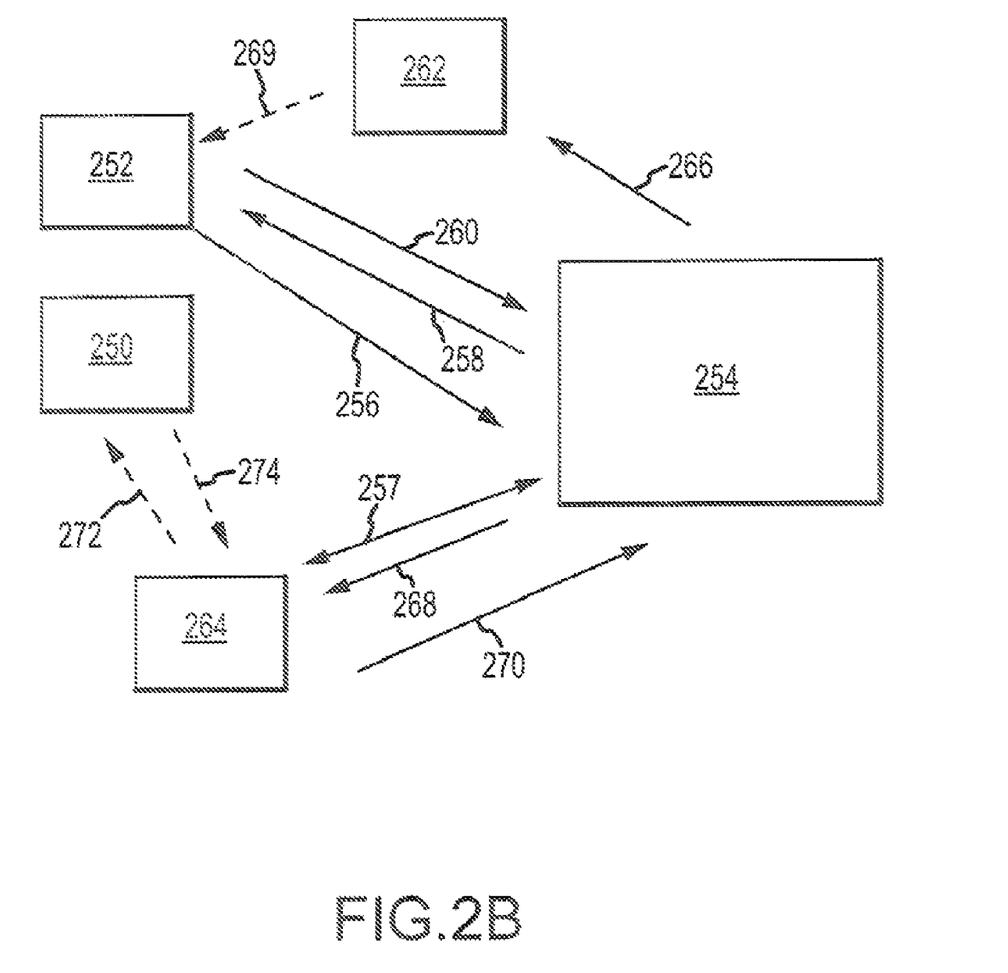
FIG. 2B illustrates one example of how transactions are processed according to embodiments of the present invention.

Further still to this example, a process of settling a credit card transaction between a customer 250 and a merchant 252 is illustrated with respect to FIG. 2B. In this example, the customer 250 uses a credit card to purchase goods from the merchant 252. In doing so, the merchant requests authorization by sending an electronic transmission (arrow 256) to the operator 254 of a system according to embodiments of the present invention. The operator 254 responds to the transmission by either authorizing or rejecting the transaction (arrow 258), which may include using rules to identify the destination entity and forward the authorization to the destination entity and receive authorization from it (arrow 257). Assuming the transaction is authorized, the merchant and customer complete the transaction. If necessary, the merchant sends additional transaction information to the operator (arrow 260), to indicate that the transaction was not completed.

Continuing with this example, the operator 254 used the transaction information to identify the origination entity (or his designee, in this case, the merchant's bank 262) and the destination entity 264, in this case, the bank that issued the customer the credit card used in the transaction. The operator 254 then consults the rules to determine whether the origination entity and the destination entity have a pre-arranged agreement embodied in rules. In this example, the credit card was issued pursuant to a license from a branded network. However, the branded network allows settlement processing outside its network. Thus, the origination entity 262 and the destination entity 264 have agreed to rules relating to the processing of their mutual transaction. The operator identifies these rules and processes the transaction accordingly.

In doing so, the operator 254 sends funds to the origination entity 262 (arrow 266) and requests reimbursement from the destination entity 264 (arrow 268). The sending of funds to the origination entity and the requesting of funds from the destination entity may be combined with other transaction such that the netting of several transactions may result in positive or negative amounts. The origination entity then makes the funds available to the merchant (arrow 269), while the destination entity reimburses the operator (arrow 270). Although not necessarily included within the operation of this example of the present invention, the destination entity bills the customer (arrow 272) and receives compensation from him (arrow 274). These functions, however, may be performed by the operator on behalf of the destination entity. It is to be understood that this is but one example of how transactions may be processed according to the present invention. Other examples are possible.

In another example, the transaction information comprises a discount certificate identifier and a merchant identifier. The discount certificate identifier may represent, for example, a manufacturer's rebate coupon that a customer presents to a merchant in exchange for a discount on goods or services. Such discount certificates typically include a UPC label that a merchant may scan contemporaneously with totaling a customer's purchases. The destination entity (i.e., the manufacturer, in this example), may be identified from information read by the scanner from the UPC label. The same information may be used to determine the value of the transaction (i.e., the amount of the discount). This information, together with the merchant identifier that may either directly or indirectly identify the origination entity, may be used to ultimately cause value to flow from the manufacturer to the merchant.

In such examples, the processor may combine multiple transactions involving the same manufacturer. The processor then requests reimbursement from the manufacturer for the value of the discount certificates. The manufacturer then credits the merchant or the merchant's designee (e.g., the merchant's bank) for the amount of the coupons submitted by the merchant. In some examples, the manufacturer simply reimburses the processor for the value of the coupons, and the processor sorts out what portion of the amount goes to any of a plurality of merchants. The processor may withhold a fee from the reimbursements and/or receive additional compensation from the manufacturer and merchant as compensation for processing the coupons. In addition to directing discount certificate transactions to the appropriate destination entity, the processor also may verify that the certificates were actually used in conjunction with a purchase of the product represented by the coupon. Many other examples are possible.

In some cases with respect to the processing of discount certificates, the issuing entity (e.g., the manufacturer) is outside the processor's network. In such cases, the processor may consolidate the discount certificates and pass them to another network in exchange for reimbursement. Other examples are possible.

In yet another example, the transaction comprises a money transfer identifier. In this example, the sender of the money transfer deposits money with an operator (e.g. a merchant) of a money transfer location, or a money transfer service provider (e.g., Western Union of Englewood, Col.), and designates a recipient of the funds. The recipient of the money transfer receives money from an operator (e.g., a merchant) of a money transfer location. The merchant, in this example, dispenses to the recipient funds previously deposited by a sender. The money transfer identifier may be used to determine both the origination entity, the destination entity, and the amount of the wire transfer. In such an example, the origination entity may be a money transfer service provider (e.g., Western Union of Englewood, Col.), the operator of the money transfer location where the sender deposited the funds, or the like. The destination entity is, for example, the merchant that dispensed the funds to the recipient.

In such an example, the money transfer service provider receives the money transfer request at the time the sender deposits the money with the originating money transfer location. The request is housed in a computer system. When the recipient of the money transfer requests the funds from the destination money transfer location, the destination location requests authorization from the money transfer service provider for the disbursement. Upon authorization, the money is disbursed to the recipient. The money transfer service provider performs settlement with both the origination and destination money transfer location by aggregating each individual location's deposit and disbursement transactions for a period of time (e.g., a day) and performing a single funds movement for the aggregate amount. For an individual transaction, the funds movement for the deposit may precede the funds movement for the disbursement. The settlement from the money transfer service provider to the originating and destination location may be the face value of the money transfer transaction less a processing fee. Many other examples are possible.

In yet another example, the transaction information may comprise an insurance identifier. In this example, a patient may present a card, such as a health benefits card, to a healthcare provider. The card may represent a pre-paid benefits account (e.g., a medical spending account) and/or insurance benefits. The provider may use the card to pre-authorize treatment for the patient, determine the patient's level of benefits and/or deductible, obtain payment from the patient's pre-paid benefits account, and/or charge the patient for any remaining balance. Thus, depending on the specific purpose for which the card is presented, the settlement entity may be one or more different entities. For amounts charged to a prepaid benefits account, the destination entity may be a benefits administrator. For amounts changed to the patient, the destination entity may be an credit account issuing bank. In most such instances, the origination entity would be the health care provider. The transaction amount may vary and may only be determinable after consultation of the rules hereinafter. For example, the rules may determine what amount of the transaction amount is allocated to an issuing bank for settlement and what amount is allocated to a benefits administrator for settlement. This all may be determined by the health insurance provider of the patient.

In yet another example, the transaction information comprises a checking account number, a deposit account identifier, and a transaction amount. In such cases, a merchant may deposit into his bank a check tendered by a customer. The bank prepares an electronic transaction having the transaction information and sends the transaction information to the host computer system. In this example, the deposit account identifier may be used to identify the origination entity, the checking account number and the routing number of the bank upon which the check is drawn may be used to identify the destination entity.

In still another example, the transaction information may comprise an electronic banking number, a host bank number, and a transaction amount. In this example, a customer uses, for example, an ATM card to withdraw funds from an ATM machine of the host bank (i.e., not the customer's bank). Thus, the host bank number identifies the origination entity and the electronic banking number identifies the destination entity (i.e., the bank that issued the ATM card to the customer).

In still another example, the transaction information comprises a source account, and target account, and an amount of the transaction. In this example, a customer uses a multi-purpose kiosk (as more fully described in previously-incorporated U.S. patent application Ser. No. 10/225,410) to exchange airline miles for pre-paid mobile phone minutes. The source account identifies the origination entity as the administrator of the customer's airline loyalty point program and the target account identifies the customer's cellular phone service provider as the destination entity. The transaction amount may be in miles; however, the rules may determine the exchange rate between airline miles and cellular phone minutes, at least between these specific entities.

In yet another example, the transaction information comprises a gift card (as more fully described in co-pending, commonly assigned U.S. patent application Ser. No. 10/010, 068, entitled, "ELECTRONIC GIFT GREETING" filed on Dec. 6, 2001, by Karas, et al., which application is entirely incorporated herein by reference) identification number, a merchant identification number, and a transaction amount. In this example, a customer, having received a gift card purchased by a gift giver from a seller, presents the gift card for payment. Thus, the destination entity may be identified as the gift card administrator, and the origination entity may be identified as the merchant or the merchant's bank.

The foregoing examples are intended to highlight the diversity of the present invention and are in no way intended to limit it. Those skilled in the art will realize many additional applications for the teachings herein.

Figure 3:
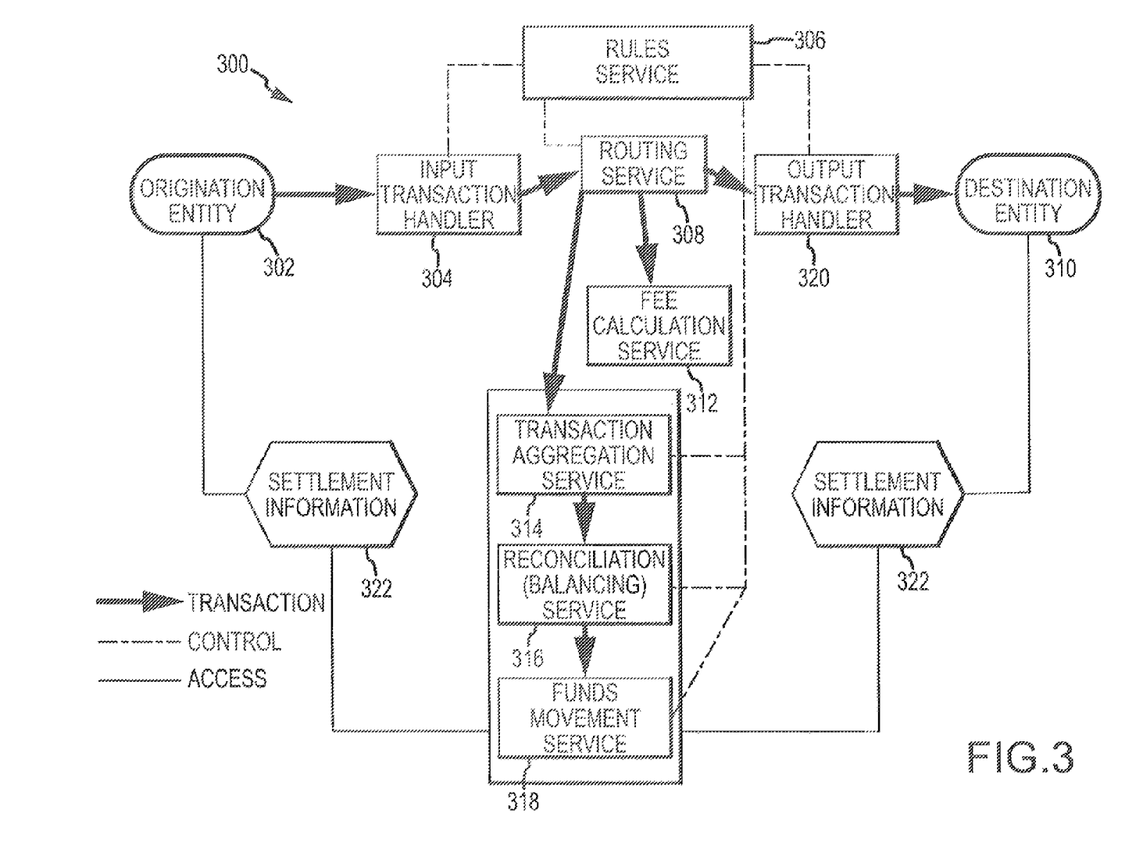
FIG. 3 illustrates a specific example of an embodiment of the present invention.

Attention is now directed to FIG. 3, which illustrates a specific example 300 of an embodiment of the invention. The example 300 of FIG. 3 illustrates a basic architecture for value-exchange transaction processing. Transactions flow from an Origination Entity 302 to an Input Transaction Handler 304. The Input Transaction Handler 304 determines the transaction type and accesses the appropriate format and data validation according to a ruleset obtained from a Rules Service 306 based on the Origination Entity 302. Data enrichment (additional value-added data) may also occur in the Input Transaction Handler 304, depending on the applicable ruleset. The transaction is then passed to a Routing Service 308, where a Destination Entity 310 is identified using rules for the particular transaction type. Again, data enrichment may occur within the Routing Service 308.

The Routing Service 308 sends transaction information to a Fee Calculation Service 312 and a Transaction Aggregation Service 314. The Fee Calculation Service 312 determines appropriate fee(s) to apply and any calculations to perform. These determinations are based on rules identified by the relationship between the Origination Entity 302, the Destination Entity 310, and the electronic transaction type. The Fee Calculation Service 312 also performs the calculations and attaches fee information to the transaction (This is a specific form of data enrichment). The Transaction Aggregation Service 314 uses rules to determine how the Origination Entity 302 and the Destination Entity 310 require transaction value information to be combined for their businesses. This combination encompasses both transaction grouping (which transaction types are grouped together) and transaction summarization (how transactions are to be added together to provide various levels of recapitulation).

The aggregated transaction information is used by a Reconciliation Service 316 to balance the system according to rules for the transaction type(s). Balancing assures that all transactions received are accounted for at various steps in the processing, and that all transactions are sent to a destination. High level aggregation is used by a Funds Movement Service 318 to generate the desired instructions for the actual value-exchange represented by a particular group of transactions.

The Routing Service 308 also sends the transaction to an appropriate Output Transaction Handler 320, based on the identity of the Destination Entity 310. Additional data enrichment may occur in the Output Transaction Handler 320 as well. The Output Transaction Handler 320 formats, validates, and sends the transaction based on rules determined by the identity of the Destination Entity 310.

Settlement information 322 is accesses by both the Origination Entity 302 and the Destination Entity 310 via methods chosen by these entities. These methods include reports, data files and Internet presentation.

This example 300 of an embodiment of the invention includes at least three advantages that may be shared by other embodiments of the invention. First, the network does not impose any rules of its own on a transaction, whether based on a brand or transaction type. The rules for processing a transaction are determined solely by the relationship between the two entities involved in the transaction (i.e., the network is brand-agnostic). Second, the network architecture is not restrictive as to the types of transactions that can be processed, i.e., it does not impose it own rules on the transaction. This network architecture allows for multiple transaction types to be processed simultaneously. It also provides the ability to combine any or all payment types for a given entity. Third, the architecture provides the ability to rapidly deploy highly-customized transaction processing and value-exchange based on rules established by the entities involved in the exchange.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. For example, those skilled in the art know how to arrange computers into a network and enable communication among the computers. Accordingly, the above description should not be taken as limiting the scope of the invention, which is defined in the following claims.

What is claimed is:

1. A method of processing a transaction involving at least two parties, the method comprising:
   establishing rules that define transaction processing between combinations of a plurality of origination entities and a plurality of destination entities;
   storing the rules at a storage arrangement associated with a host computer system;
   receiving at the host computer system transaction information relating to the transaction between the two parties, wherein:
      the transaction comprises a financial transaction involving a credit account,
      one of the parties comprises a particular one of the origination entities that is a merchant bank,
      one of the parties comprises a particular one of the destination entities that is an issuing bank,
      the transaction information contains at least a credit account identifier from which at least one of the parties may be identified, and
      the merchant bank is a financial entity that processes transactions on behalf of a merchant;

at the host computer system, using the transaction information to identify at least one of the parties and to identify that at least one of the parties belongs to a card association network, wherein the card association network comprises a computer processing system that routes and settles financial transactions;

consulting the storage arrangement to determine the rules that define transaction processing for the at least one party;

determining from the rules that the transaction is allowed to be settled outside of the card association network; and processing the transaction based, at least in part, on the rules by requesting funds from the issuing bank to pay the merchant bank using rules directly established between the merchant bank and the issuing bank outside of the card association network.

2. The method according to claim 1, wherein the rules define one or more of: routing of the transaction, fees associated with the transaction, timing of settlement, method of settlement, aggregation and reporting, dispute resolution, compliance, fraud detection, and risk sharing.

3. The method according to claim 1, wherein the transaction relates to a selection from the group consisting of credit card transaction, retail card transaction, debit card transaction, account withdrawal, money transfer, gift card, negotiable instrument, loyalty or reward points, pre-paid commodities, insurance benefits, cell-phone minutes, stored value card, and discount certificate.

4. The method according to claim 1, wherein receiving transaction information comprises receiving an electronic message or transmission from a transaction processing device.

5. The method according to claim 4, wherein the transaction processing device comprises a selection from the group consisting of an automated teller machine, a merchandise scanner, a point-of-sale device, a data entry device, a Radio Frequency (RF) fob, a point-of-sale computer, a money transfer device, a telephone and a PDA.

6. The method according to claim 1, wherein processing the transaction comprises:
    forwarding information representing at least a portion of the transaction to a network or a destination processing system.

7. The method according to claim 6, wherein the network comprises one or more of the Automated Clearing House network, the Federal Reserve network, a branded network, a banking network, an international banking network, a money transfer network, a loyalty network, a health care benefits network, a discount certificate clearinghouse, and the Internet.

8. A system for processing a transaction involving at least two parties, the system comprising:
    a host computer system; and
    a storage arrangement, wherein the storage arrangement is configured to store rules that define transaction processing between combinations of a plurality of origination entities and a plurality of destination entities;
    wherein the host computer is programmed to:
    receive transaction information relating to the transaction between the two parties, wherein:
        the transaction comprises a financial transaction involving a financial account;
        one of the parties comprises a particular one of the origination entities that is a merchant bank;
        one of the parties comprises a particular one of the destination entities that is an issuing bank;
        the transaction information contains at least a financial account identifier from which at least one of the parties may be identified; and
        the merchant bank is a financial entity that processes transactions on behalf of a merchant;
    use the transaction information to identify at least one of the parties and to determine whether the at least one of the parties belongs to a card association network;
    consult the storage arrangement to determine the rules that define transaction processing for the at least one of the parties;
    determine from the rules that the transaction is allowed to be settled outside of the association network, wherein the card association network comprises a computer processing system that routes and settles financial transactions; and
    cause the transaction to be processed based, at least in part, on the rules by requesting funds from the issuing bank to pay the merchant bank using rules directly established between the two banks outside of the association network.

9. The system according to claim 8, wherein, in receiving transaction information, the host computer system is further programmed to receive an electronic message or transmission from a transaction initiation device.

10. The system according to claim 9, wherein the transaction initiation device comprises a selection from the group consisting of an automated teller machine, a merchandise scanner, a point-of-sale device, a point-of-sale computer, a data entry device, a Radio Frequency (RF) fob, a money transfer device, a telephone and a PDA.

11. The system according to claim 8, wherein, in causing the transaction to be processed, the host computer system is further programmed to forward information representing at least a portion of the transaction to a destination computer processing system.

12. The system according to claim 11, wherein the destination computer processing system comprises one or more of the Automated Clearing House network, the Federal Reserve network, a branded network, a banking network, a money transfer network, an international banking network, a loyalty network, a health care benefits network, a discount certificate clearinghouse, and the Internet.

13. A network for processing transactions, comprising:
    a host computer system that is programmed to:
        store transaction processing rules, using a storage arrangement, that define transaction processing between combinations of a plurality of origination entities and a plurality of settlement entities;
        receive transaction information from a transaction initiation device, wherein:
            the transaction information relates to a financial transaction involving at least two parties and a financial account;
            the parties have a pre-established relationship embodied in transaction processing rules;
            the transaction information comprises at least a financial identifier for determining at least one party to the transaction;
            a first party of the parties comprises a particular one of the origination entities that is a merchant bank,
            a second party of the parties comprises a particular one of the destination entities that is an issuing bank, and
            the merchant bank is a financial entity that processes transactions on behalf of a merchant;

consult the storage arrangement to determine the transaction processing rules that define transaction processing for at least one of the parties;
determine that at least one of the parties belongs to a card association network, wherein the card association network comprises a computer processing system that routes and settles financial transactions;
determine the rules relating to the transaction and that the transaction is allowed to proceed outside of the card association network; and
process at least in part, the transaction by requesting funds from the second party and to send funds to the first party outside of the card association network.

14. A computerized method of processing a transaction involving two parties wherein:
the parties have a pre-established relationship regarding how to process a financial transaction outside of a card association network embodied in rules relating to the relationship,
a first party of the parties comprises an origination entity that is a merchant bank,
a second party of the parties comprises a destination entity that is an issuing bank, and
the merchant bank is a financial entity that processes transactions on behalf of a merchant;
the card association network comprises a computer processing system that routes and settles financial transactions, the method comprising:
receiving transaction information relating to the transaction at a host computer system, wherein the transaction information comprises a financial transaction involving an account identifier;
identifying the first party and the second party at least in part from the transaction information;
consulting a database containing the rules to determine how the transaction should be processed; and
determining whether the rules permit the financial transaction to be processed outside of the card association network; and
processing the transaction based at least in part on the rules by requesting funds from the second party and sending funds to the first party outside of the card association network.

15. The method of claim 14, wherein the second party comprises a selection from the group consisting of issuing financial institution, money transfer service provider, telephone company, airline, loyalty or rewards provider, manufacturer, insurance company, and retailer bank.

16. The method of claim 14, wherein the transaction involves value, and wherein the value is represented by a selection from the group consisting of bank card account number, credit card account number, discount certificate, bank account number, debit card account number, stored value account number, insurance coverage identifier, money transfer identifier, loyalty account identifier, telephone account number, airline ticket PNR identifier, and gift card identifier.

17. The method of claim 16, wherein the value comprises a selection from the group consisting of money, credits, loyalty points, minutes, miles, and insurance benefits.

18. The method of claim 14, further comprising:
receiving additional rules from a third party that comprises a destination entity; and
processing a second transaction according to the additional rules.

19. The method of claim 14, further comprising identifying processing rules relating to the second party.

20. The method of claim 19, wherein identifying processing rules comprises consulting a table having rules information relating to a plurality of destination entities.

21. The method of claim 14, wherein processing the transaction comprises aggregating a plurality of transactions having a common destination entity and sending a request for reimbursement to the second party.

22. The method of claim 14, wherein processing the transaction comprises aggregating a plurality of transactions having a common origination entity and sending a reimbursement to the first party.

23. A system for processing a value transaction between an origination entity and a destination entity outside of a financial processing network, wherein the financial processing network comprises a computer processing system that routes and settles financial transactions, the system comprising:
an input transaction handler configured to execute instructions residing on at least one non-transitory computer-readable storage medium, wherein:
the instructions cause the input transaction handler to determine a transaction type according to a ruleset obtained from a rules service based on the origination entity;
the origination entity comprises a merchant bank;
the destination entity comprises an issuing bank; and
the merchant bank is a financial entity that processes transactions on behalf of a merchant;
a routing service configured to execute instructions residing on the at least one non-transitory computer-readable storage medium, wherein:
the instructions cause the routing service to identify the destination entity using rules for the transaction type; and
the routing service determines whether the transaction type may is allowed to be processed outside of the financial processing network;
a fee calculation service configured to execute instructions residing on the at least one non-transitory computer-readable storage medium, wherein:
the instructions cause the fee calculation service to determine a fee to apply based on rules identified by a relationship between the origination entity and the destination entity and attaches fee information to the transaction; and
an output transaction handler configured to execute instructions residing on the at least one non-transitory computer-readable storage medium, wherein:
the instructions cause the output transaction handler to format, validate, and send the transaction based on rules determined by the identity of the destination entity outside of the financial processing network.

24. The system of claim 23, further comprising: a transaction aggregation service configured to execute instructions residing on the at least one non-transitory computer-readable storage medium, wherein the instructions cause the transaction aggregation service to use rules to determine how the origination entity and the destination entity require transaction information to be combined for their businesses, which includes both transaction grouping and transaction summarization.

25. The system of claim 24, further comprising a reconciliation service configured to execute instructions residing on the at least one non-transitory computer-readable storage medium, wherein the instructions cause the transaction reconciliation service to use information from the transaction aggregation service to balance multiple transactions according to rules for the transaction types.

26. The system of claim 25, further comprising a funds movement service configured to execute instructions residing on the at least one non-transitory computer-readable storage medium, wherein the instructions cause the funds movement service to generate instructions based upon the rules defined by origination and destination entities for an actual value-exchange represented by a particular group of transactions.

27. The method according to claim 1, wherein the plurality of origination entities and the plurality of destination entities are selected from a group of entities, consisting of: merchants, acquiring banks, gift card or stored value processors, health care providers, airlines, and telephone companies.

* * * * *